May 4, 1965   H. E. STRAUB   3,181,558
LIQUID LEVEL CONTROL FOR LIVESTOCK WATERING TROUGHS
Filed Nov. 21, 1962   2 Sheets-Sheet 1
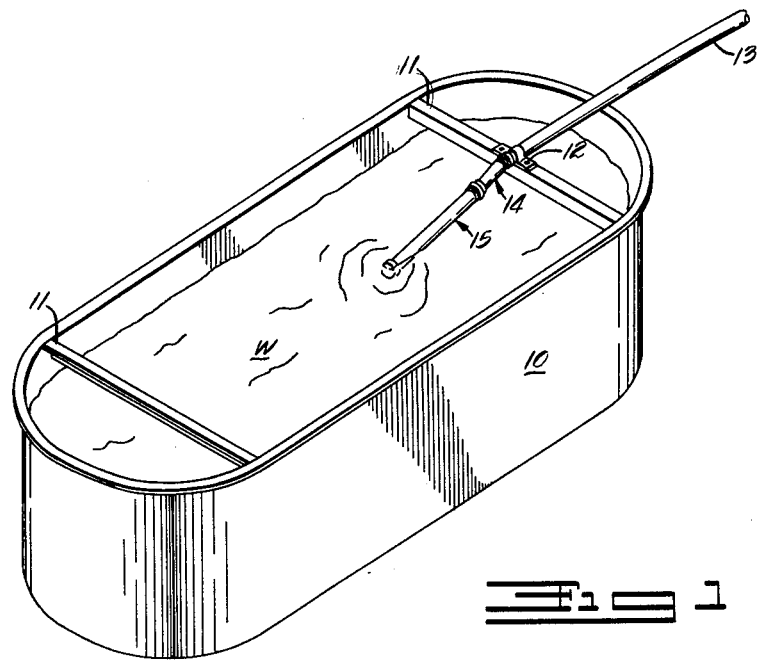
Fig. 1
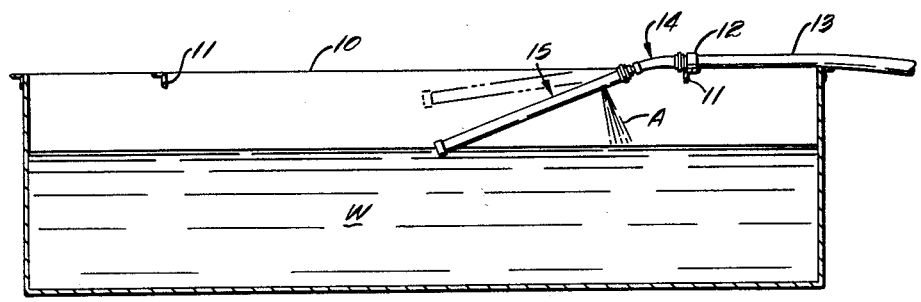
Fig. 2
INVENTOR.
HENRY E. STRAUB, DECEASED,
BY MARTHA HUNT STRAUB, ADMINISTRATRIX
BY MAHONEY, MILLER & RAMBO
BY 
ATTORNEYS.

May 4, 1965
H. E. STRAUB
3,181,558
LIQUID LEVEL CONTROL FOR LIVESTOCK WATERING TROUGHS
Filed Nov. 21, 1962
2 Sheets-Sheet 2
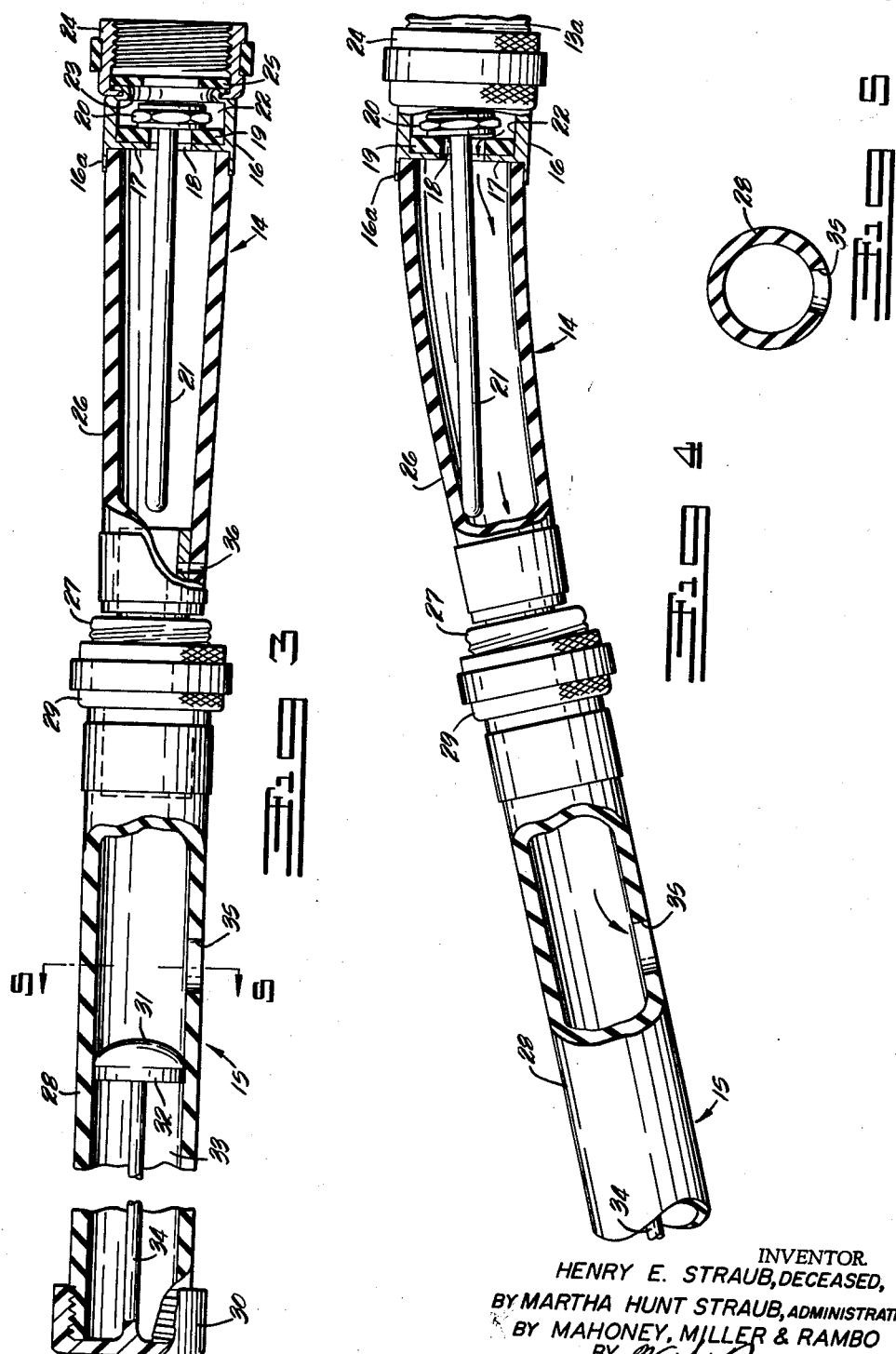
INVENTOR.
HENRY E. STRAUB, DECEASED,
BY MARTHA HUNT STRAUB, ADMINISTRATRIX
BY MAHONEY, MILLER & RAMBO
BY
ATTORNEYS.

United States Patent Office 3,181,558
Patented May 4, 1965

3,181,558
LIQUID LEVEL CONTROL FOR LIVESTOCK
WATERING TROUGHS
Henry E. Straub, deceased, late of Hartford Township, Licking County, Ohio, by Martha Hunt Straub, administratrix, Hartford Township, Licking County, Ohio (R.R. 1, Croton, Ohio)
Filed Nov. 21, 1962, Ser. No. 239,276
5 Claims. (Cl. 137—438)

This invention relates generally to liquid level control valves. It relates, more specifically, to a novel valve assembly for automatically controlling the flow of water from a supply conduit into a livestock watering trough in response to the level of liquid in the watering trough.

It is a well-known practice to control the flow of a liquid from a supply conduit into a receptacle by a valve assembly automatically responsive to the level of liquid contained in the receptacle. One well-known type of valve assembly widely utilized for this purpose comprises, in general, a valve having a relatively movable valve member and a float device operatively connected to the movable valve member. The float device usually includes a buoyant, hollow sheet metal ball connected to the movable valve member by a lever-type linkage mechanism and the entire valve assembly is mounted on the receptacle to permit the buoyant ball element to float on the surface of the liquid, and to close the valve when the liquid attains a desired level within the receptacle. These so-called rigid ball-type float valves have been used for many years in livestock watering troughs. However, the ordinary types of ball-type float valves are particularly susceptible to damage when used in livestock watering troughs. The metal ball or float may be broken or crushed with a consequent loss of buoyancy, or the linkage mechanism may become bent or otherwise damaged to such an extent to cause failure or malfunctioning of the valve. Moreover, cattle often interfere with the operation of such valves, either inadvertently or through curiosity, unless the assembly is well protected. Such interference usually takes the form of damage to the metal ball or float, or the mechanical linkage therefor. Any decrease or loss of buoyancy of the ball element will permit the valve to remain open for a longer period of time, thus permitting the water level to exceed the normal predetermined level and may result in overflowing the tank or trough. Failure of or damage to the valve assembly may result in the loss of water which is a substantial economical factor in many areas. In addition, spillage of water around a watering trough which is not provided with adequate drainage creates a highly unsanitary condition. Additionally, in outdoor watering troughs, the float valve is often subjected to freezing temperatures and this often results in permanent damage or leakage in the usual type of metal float-actuated valve assembly.

It is, therefore, the primary object of this invention to provide a liquid level control valve assembly which is of rugged and durable construction and which is particularly suited for use in maintaining a desired level of water in a livestock watering trough.

It is another object of this invention to provide a liquid level control valve in which the movable valve element is normally urged to a closed position by the pressure of the incoming water supply, to thus permit the valve to "fail safe" in the event of damage or interference by livestock.

It is a further object to provide a liquid level control valve of this character which is actuated between open and closed positions in response to the bending or flexing movement of a resiliently flexible pipe-like extension arranged to float upon or within the body of liquid contained in an associated watering trough or receptacle.

Yet another object of the invention is to provide a rugged and structurally simple liquid level control valve for livestock watering troughs which takes the form of an elongated, flexible, tubular hose casing suitably secured at one end thereof to the watering trough and having an outwardly projecting free end portion of sufficient buoyancy to float within the body of water contained in the trough, and which incorporates therein a tiltable, "wobble-type" valve element arranged normally to arrest the flow of water through the valve, but being movable in response to the downward flexure of the flexible outer casing to an open position permitting water to flow from an associated supply conduit into the watering trough.

A further object is to provide a liquid level control valve of this character which is so constructed as to preclude undesired siphoning of water from the watering trough backwardly into the associated fresh water supply conduit.

These and other objects and advantages of this invention will become more readily apparent by reference to the following detailed description and the accompanying drawings, wherein:

FIGURE 1 is a perspective view of a livestock watering tank embodying the present liquid level control valve;

FIGURE 2 is a vertical longitudinal sectional view taken through the watering tank or trough and showing the present liquid level control valve in operation;

FIGURE 3 is a medial longitudinal sectional view, partially in elevation, of the present valve assembly on an enlarged scale and showing the valve in a closed position;

FIGURE 4 is a similar view showing the valve in an open position; and

FIGURE 5 is a transverse vertical sectional view taken along line 5—5 of FIGURE 3 and showing the discharge outlet of the present liquid level control valve.

Referring to the drawings, there is illustrated in FIGURE 1 a liquid storage trough or tank 10 of the type commonly utilized for the watering of livestock. Interconnecting the upper marginal edges of the tank 10 are a pair of angle iron cross-braces 11. Secured to one of the cross-braces 11, by means of a clamp 12 or other suitable device, is a fresh water supply conduit or hose 13 whose opposite end extends to a suitable source of fresh water (not shown). Advantageously, the outer end of the supply conduit 13 is provided with a male, screw-threaded hose coupling 13a (see FIGURE 4). Attached to the coupling 13a of the supply conduit 13 is the present improved liquid level control valve assembly.

The overall valve assembly, as best shown in FIGURES 3 and 4, includes an inner valve-containing section 14 and an outwardly extending, buoyant float section 15. The valve section 14 comprises an annular, metal sleeve 16 formed with a transverse seat-forming wall 17 having an axially disposed circular valve passage 18. Positioned adjacent the inner surface of the wall 17 is an annular washer 19 of rubber or other resiliently compressible material which forms a valve-seating surface for the relatively enlarged head portion 20 of a movable valve stem 21 which extends through the valve passage 18. The sleeve 16 thus defines an internal valve chamber 22 for the head portion 20 of the movable valve stem 21. Rotatably secured to the inner end of the sleeve 16, as by means of a crimp flange 23, is an internally threaded, female hose coupling 24 which is detachably connected to the male coupling 13a of the supply conduit 13. To insure a liquid-tight seal between the coupling 24 and the sleeve 16, an annular rubber hose washer 25 is provided in the female coupling 24 and is arranged so as to be compressed into tight sealing engagement with the crimp flange 23 and the inner wall of the coupling 24 when the latter is screwed tightly upon the male coupling 13a of the supply conduit.

The valve stem 21 extends outwardly beyond the sleeve 16 and is confined in an elongated, resiliently flexible, tubular casing 26 which is secured to the metal sleeve 16 by means of the clamping flange 16a. The tubular casing 26 is slightly tapered toward the outer end thereof which is provided with a metal, screw-threaded male coupling 27. As indicated by a comparison of FIGURES 3 and 4, the enlarged head portion 20 of the movable valve member is arranged normally to seat against the washer 19 in response to the pressure of water within the valve chamber 22. However, when the flexible casing 26 is bent or flexed downwardly, as shown in FIGURE 4, the casing engages the outer end portion of the rigid valve stem 21 and displaces the same downwardly to thus rock or tilt the head portion 20 to an annular position with respect to the seat-forming washer 19, thereby opening the valve passage 18 to permit water to flow from the valve chamber 22 and through the casing 26.

In accordance with this invention, the flexible casing 26 of the valve section 14 is arranged to be flexed by the buoyant float section 15 which is responsive to the level of the body of water W in the tank 10. The float section 15 consists of an elongated, cylindrical tube 28 which forms a longitudinal extension of the casing 26. Preferably, the inner end of the tube 28 is provided with an internally shrew-threaded, female hose coupling 29 for detachable connection with the male coupling 27 of the valve section 14. The opposite end of the tube 28 is closed by a cap 30 which may be threaded or otherwise suitably secured to the outer end of the tube 28. Disposed within the tube 28 intermediate the ends thereof is a sealing plug 31 having a peripheral edge 32 forming a liquid-tight seal with the interior wall of the tube. The plug 31 is axially spaced a predetermined distance from the cap 30, thereby forming a closed, buoyant chamber 33 in the outer end portion of the tube 28. The proper spacing between the plug 31 and cap 30 is maintained by a spacer rod 34 of appropriate length extending axially and interconnected therewith. Preferably, the cap 30, spacer rod 34 and plug 31 are integrally molded as a unit from a suitable rigid synthetic resin. Formed in the wall of the tube 28 between the plug 31 and the coupling 29 is an outlet opening 35 through which water is discharged when the valve is opened. The outlet 35 is of a size to prevent restriction to the flow of the liquid and is formed in the bottom portion of the tube so as to direct a stream of water A downwardly into the associated tank 10. Preferably, the tube 28 is formed from a semi-rigid plastic or synthetic resin material and has a weight sufficient to bend or flex the casing 26 downwardly to open the valve when the tube 28 is unsupported. If desired, the tube 28 may be formed from a relatively low density plastic material having a density less than water, in which event, the plug 31 which forms the closed, buoyant chamber 33 may be eliminated, as the tube 28 would then float in the water without the added buoyancy provided by the closed chamber 33.

A relatively small anti-siphoning outlet 36 is formed in the wall of the casing 26 adjacent the coupling 27. This anti-siphoning outlet is provided for the purpose of precluding the back flow of water from the tank 10 and through the valve into the fresh water supply when the main discharge outlet 35 is immersed in the body of water W contained in the tank. As will be noted, the anti-siphoning outlet 36 is located at a point which shall always remain above the surface of the water in the tank when the latter is full.

The operation of the present valve assembly is fully automatic in response to variations in the surface level of the body of water W within the tank 10. Assuming that the maximum level desired in the tank is substantially as shown in FIGURE 1, the present liquid level control valve is mounted so that the flexible casing 26 of the valve section will occupy a substantially unflexed or straight position, as shown in FIGURE 3, when the buoyant float section 15 rises with the water to this desired level. In this straight, unflexed position of the casing 26, the valve head 20 will remain seated or closed under the pressure exerted upon the head 20 by the incoming water supply. As the level of water recedes in the tank 10, the buoyant float section 15 will also drop with the level of the water and the weight of the float section 15 will cause the casing 26 to flex downwardly, as shown in FIGURE 4, to thus engage and tilt the valve stem 21 downwardly and unseat the head 20 to permit water to flow from the supply conduit 13, through the valve section 14 and outwardly through the discharge outlet 35 of the float section 15.

It is thus readily apparent that the valve assembly of this invention provides a fully automatic liquid level control for maintaining a predetermined level of liquid in a receptacle. The present liquid level control valve is particularly suitable for use in livestock watering troughs due to its simple, rugged and flexible construction. Further, due to the use of flexible tubing and valve seat components, the present control valve may be subjected to freezing without causing permanent damage to the parts thereof.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In a liquid level control; an elongated, tubular valve casing composed essentially of resiliently flexible material and provided at one end thereof with an inlet opening for connection with a liquid supply conduit, an outlet opening at the opposite end thereof and a transversely disposed, annular valve seat arranged intermediate said inlet and outlet openings; a movable valve stem element disposed longitudinally within said casing and having a relatively enlarged head portion disposed normally in seated engagement with said valve seat on the side thereof adjacent said inlet opening, the head portion of said valve stem element, when occupying a seated position against said valve seat, serving to interrupt the flow of liquid through said casing, said valve stem element being movable in response to a given flexing movement of said casing to an unseated position permitting the flow of liquid through said casing; and an elongated, tubular float extension communicating with the outlet opening of said casing and forming a longitudinal continuation of said casing, said float extension being formed with a liquid discharging outlet and having a buoyancy to float in water, but having sufficient weight when unsupported to flex said casing to a valve-opening position.

2. In a liquid level control; an elongated, tubular valve casing composed essentially of resiliently flexible material and having an inlet end and an outlet end and an internal annular valve seat disposed transversely of said casing intermediate the ends thereof; a movable valve element extending longitudinally within said casing and having an elongated rigid stem extending through said valve seat and a relatively enlarged head portion disposed normally in seated engagement with said valve seat on the side thereof adjacent the inlet end of said casing, said valve casing being resiliently bendable to a position to engage the stem of said valve element and to unseat the head portion thereof from said valve seat; means connected with said casing for fixedly supporting the inlet end thereof; and an elongated tubular float extension having an inner end portion connected with the outlet end of said casing and having a buoyant outer end portion extending remotely from said casing for floating engagement with a body of liquid, said float extension forming a longitudinal continuation of said casing and having a discharge outlet therein, said float extension being movable in response to changing levels of a body of liquid in which it is positioned to bend said casing between valve opening and closing positions.

3. A liquid level control as defined in claim 2, wherein said valve casing is formed a distance inwardly from the outlet end thereof with a downwardly opening, antisiphoning outlet.

4. A liquid level control as defined in claim 2, wherein said float extension comprises a tubular pipe closed at the outer end thereof and provided intermediate the ends thereof with an internal plug defining with the closed end of said pipe an enclosed air chamber, and whrerein the discharge outlet of said float extension is disposed between the inner end thereof and said plug.

5. A liquid level control device comprising an elongated tubular body having an inlet end section for connection to a liquid supply conduit and an outer buoyant end section adapted to float in a body of liquid whose level is to be controlled by said device, the inlet end section of said body including a resiliently flexible outer casing and an internal, normally closed valve means arranged for movement to an open position in response to a downward flexing of said casing, the outer buoyant end section of said body being provided with a discharge outlet and having a weight sufficient to flex said casing downwardly to open said valve means when said outer buoyant end section occupies a position substantially below the inlet end section of said body.

References Cited by the Examiner
UNITED STATES PATENTS

| | | | |
|---|---|---|---|
| 1,642,926 | 9/27 | Imschweiler | 137—438 |
| 1,864,978 | 6/32 | Cottrell | 251—342 |
| 2,149,584 | 3/39 | Davis | 251—342 |
| 2,582,853 | 1/59 | Smith | 137—403 |

WILLIAM F. O'DEA, *Primary Examiner.*
LAVERNE G. GEIGER, *Examiner.*